United States Patent [19]

Iwamura et al.

[11] Patent Number: 5,962,588

[45] Date of Patent: Oct. 5, 1999

[54] CURABLE RESIN COMPOSITION, PAINT USING THE SAME, AND COAT-FINISHING METHOD

[75] Inventors: Goro Iwamura, Sakai; Shigeki Matsui, Izumiotsu; Ichiro Azuma, Kishiwada; Yoshiaki Marutani, Hiroshima; Hiroyuki Uemura, Hiroshima; Tadamitsu Nakahama, Hiroshima; Shinji Sasaki, Hiroshima; Kazuhi Koga, Hiroshima; Takashi Tomita, Hiroshima; Mika Ohsawa, Hiroshima, all of Japan

[73] Assignees: Dainippon Ink and Chemicals, Inc., Tokyo; Mazda Motor Corporation, Aki-gun, both of Japan

[21] Appl. No.: 08/968,723

[22] Filed: Nov. 12, 1997

Related U.S. Application Data

[62] Continuation of application No. 08/742,693, Nov. 4, 1996, abandoned, which is a continuation of application No. 08/338,508, filed as application No. PCT/JP94/00517, Mar. 30, 1994, abandoned.

[30] Foreign Application Priority Data

Mar. 30, 1993 [JP] Japan ..................................... 5-072568

[51] Int. Cl.$^6$ ....................................................... C08F 8/00
[52] U.S. Cl. ......................... 525/103; 525/101; 525/100; 525/207; 525/208; 525/209; 526/279; 526/273; 526/271; 528/26; 528/27; 106/287.13; 106/287.16
[58] Field of Search ..................................... 525/103, 101, 525/100, 207, 208, 209; 526/279, 273, 271; 528/26, 27; 106/287.13, 287.16

[56] References Cited

U.S. PATENT DOCUMENTS

| | | | |
|---|---|---|---|
| 4,195,141 | 3/1980 | Biining et al. ........................... | 525/328 |
| 4,368,297 | 1/1983 | Kato et al. ............................... | 525/342 |
| 4,371,664 | 2/1983 | Kato et al. ............................... | 525/100 |
| 4,818,790 | 4/1989 | Ooka et al. .............................. | 525/103 |
| 4,861,667 | 8/1989 | Takayanagi et al. .................... | 428/421 |
| 4,983,715 | 1/1991 | Miwa et al. ............................. | 528/272 |
| 5,650,475 | 7/1997 | Marutani et al. ........................ | 528/26 |

FOREIGN PATENT DOCUMENTS

| | | |
|---|---|---|
| 57-21410 | 2/1982 | Japan . |
| 57-162711 | 10/1982 | Japan . |
| 60-260946 | 12/1985 | Japan . |

*Primary Examiner*—Margaret Moore
*Attorney, Agent, or Firm*—Armstrong, Westerman, Hattori, McLeland & Naughton

[57] ABSTRACT

The present invention provides a curable resin composition incorporating an oligomer containing blocked hydroxyl group, an epoxy-group containing compound, hydrolytic silyl-group containing compound, and a dissociation catalyst and/or curing catalyst, each possessing a specific molecular weight; a paint which uses this resin composition as a binder; and a coat-finishing method which coat-finishes any desired material using the aforementioned resin composition and paint. According to the present invention, it is possible to reduce viscosity, and consequently increase the coat non-volatile content and hence improve acid resistance, abrasion resistance, and the like. In addition, according to the present invention, it is possible to obtain a curable resin composition, paint using this curable resin composition, and coat-finishing method for this paint in which the aforementioned resin and paint have an extremely high utility and possess a high solid content wherein air bubbles and drip-runs are not generated.

10 Claims, No Drawings

5,962,588

CURABLE RESIN COMPOSITION, PAINT USING THE SAME, AND COAT-FINISHING METHOD

This application is a continuation of application Ser. No. 08/742,693 filed Nov. 4, 1996, now abandoned, which is a continuation of application Ser. No. 08/338,508 filed Nov. 23, 1994, now abandoned, which is a §371 national phase of international application PCT/JP94/00517 filed Mar. 30, 1994.

BACKGROUND OF THE INVENTION

1. Field of the Invention

The present invention relates to a novel and useful curable resin composition, paint using this curable resin composition, and coat-finishing method which applies this aforementioned paint. In particular, the present invention relates to curable resin composition possessing a high solid content, a novel and useful high solid content-type paint which utilizes this aforementioned curable resin composition of a high solid content, and a novel coat-finishing method for effectively applying this aforementioned high solid content-type paint.

More concretely, according to an aspect of the present invention, a curable resin composition containing at least one specific compound is provided, wherein the specific compound is selected from the group consisting of compounds possessing four functional groups: a blocked hydroxyl group (i) which forms a free hydroxy group by easily cleaving thereof by means of a water in the atmosphere and an application of heat (hereafter referred to as "blocked hydroxyl group"); epoxy group (ii); acid anhydride group (iii); and hydrolytic silyl group (iv), and wherein the blocked hydroxyl group (i) and epoxy group (ii) are incorporated into a vinyl polymer having a number average molecular weight of not greater than 1,500, the acid anhydride group (iii) is incorporated into a vinyl polymer having a number average molecular weight of not greater than 1,500 or an acid anhydride having a number average molecular weight of not greater than 1,500, and the hydrolytic silyl group is incorporated into a vinyl polymer having a number average molecular weight of not greater than 5,000 or a hydrolytic silyl group-containing compound having a number average molecular weight of not greater than 5,000.

In other words, a curable resin composition is provided which contains as essential coating components a compound having a specific molecular weight range and possessing blocked hydroxyl group and at least one functional group selected from the group consisting of acid anhydride group, epoxy group, and hydrolytic silyl group (hereafter referred to as "acryl oligomer"); and a compound possessing a hydrolytic silyl group and at least one functional group selected from the group consisting of blocked hydroxyl group, epoxy group, and acid anhydride group.

In addition, according to second aspect of the present invention, a paint is provided which employs, as an essential binder component, a curable resin composition, as obtained in the aforementioned, principally comprising a so-called low-viscosity acryl oligomer in which hydroxyl group is "blocked" by a specific compound.

According to a third aspect of the present invention, a coat-finishing method is provided which employs a curable resin composition principally comprising a so-called low-viscosity acryl oligomer in which hydroxyl group is "blocked" by a specific compound and a paint for use as a clear coat in a 1-coat • 1-bake system, 2-coat • 1-bake system, 2-coat • 2-bake system, 3-coat • 2-bake system, and overcoat system.

2. Relevant Art

In recent years, line coating performed by conducting a two-coat-one-bake (2C-1B) finish using a combination of an acryl polyol and a melamine resin is being used in the shell plate coating of vehicles. However, from this coating line, a number of problems have arisen such as speeding of the global warming phenomenon attributed to the release of a large amount of solvents into the atmosphere, as well as combustion processing of these emitted solvents and formation of a large quantity of carbon dioxide.

The prospects for imparting aqueous characteristics to, in particular, the base coat are currently being widely examined. With regard to the clear coat, coating layer qualities such as an attractive external appearance and a high durability are desirable. In addition, water base paints, powder paints, ultra-violet light hardened paints and the like are similarly under extensive examination, however, the closest potential solution appears to lie in the reduction of solvents of conventional resins.

In the case when molecular weight reduction is conducted in order to achieve a high solid content, using a combination formed from acryl polyol-melamine resin according to the conventional art, a large amount of hydroxyl groups must be incorporated in order to compensate for insufficient hardening. However, according to this process, it is not always possible to achieve a low viscosity. Moreover, a coating layer which has been formed by means of hardening a resin with a high hydroxyl group value using a melamine resin leads to an extreme reduction of the acid resistance. In addition, at the time of coating, inconveniences occur such as a remarkable generation of drip-runs along the longitudinal face accompanying a reduction in the viscosity.

In addition, a method is currently being examined for testing solvent reduction by means of using a special portion from the structure of the polymer itself such as a star polymer or the like.

Consequently, it is an objective of the present invention to provide a curable resin composition with a high solid content, and a high solid content-type paint, both possessing an extremely high utility in which a low viscosity is achieved, as well as an improved resistance to acid and abrasion wherein air bubbles and drip-runs are not generated such that the aforementioned various problems with the conventional art are solved. In addition, it is an objective of the present invention to provide a coat-finishing method for coat-finishing a paint with a high solid content and an extremely high utility wherein the aforementioned properties are significantly improved.

SUMMARY OF THE INVENTION

According to the present invention a curable resin composition containing at least one specific compound is provided, wherein the specific compound is selected from the group consisting of compounds possessing four functional groups: a blocked hydroxyl group (i) which forms a free hydroxy group by easily cleaving thereof by means of water in the atmosphere and an application of heat (hereafter referred to as "blocked hydroxyl group"); epoxy group (ii); acid anhydride group (iii); and hydrolytic silyl group (iv), and wherein the blocked hydroxyl group (i) and epoxy group (ii) are incorporated into a vinyl polymer having a number average molecular weight of not greater than 1,500, the acid anhydride group (iii) is incorporated into a vinyl polymer having a number average molecular weight of not greater than 1,500 or an acid anhydride having a number average molecular weight of not greater than 1,500, and the hydrolytic silyl group is incorporated into a vinyl polymer having a number average molecular weight of not greater than 5,000 or a hydrolytic silyl group-containing compound having a number average molecular weight of not greater than 5,000.

In addition, according to the present invention, a paint is provided which employs, as a binder, the curable resin composition mentioned above.

Furthermore, according to the present invention, a coat-finishing method is provided which applies the paint mentioned above to a material to be coated, and is characterized in comprising a coating method for coating paint according to a 1-coat • 1-bake system, 2-coat • 1-bake system, 2-coat • 2-bake system, 3-coat • 2-bake system, and overcoat system.

With regard to the curable resin composition and the paint mentioned above, a number of advantages result; in particular, it is possible to achieve both low-temperature curing and a reduction in the viscosity, in addition to improving the acid and abrasion resistances. Moreover, the aforementioned curable resin composition and paint exhibit an extremely high utility wherein air bubbles and drip-runs are not generated.

In addition, according to the coat-finishing method of the invention, it is possible to produce superior characteristics such as the aforementioned acid resistance and abrasion resistance by means of coat-finishing the paint mentioned above employing, as a binder, the curable resin composition of the invention onto a material to be coated. Consequently, the coating film obtained by means of the coat-finishing method of the invention displays superior acid, solvent, weather and abrasion resistances and hence serves as a useful top coat for vehicles and the like.

PREFERRED EMBODIMENTS

In accordance with the objectives of the present invention, the inventors of the present invention, as a result of intensive investigation, have found that reduction of the viscosity can be achieved by means of a process in which molecular weight, as well as the glass transition temperature are both lowered.

Namely, in order to reduce the polarity of a low-molecular weight acryl resin, the inventors of the present invention have focused collectively on a resin composition comprising at least one type of resin and possessing a blocked hydroxyl group as an essential functional group, and a resin composition possessing this aforementioned blocked hydroxyl group, as well as an epoxy group, acid anhydride group and hydrolytic silyl group as essential functional groups. As a result, they have succeeded in providing a curable resin composition of a high solid content comprising a compound possessing the aforementioned blocked hydroxyl group and having a number average molecular weight (hereafter referred to as "molecular weight") of not greater than 1,500; a compound having a molecular weight of not greater than 1,500 and possessing an epoxy group as an essential functional group; a compound having a molecular weight of not greater than 1,500 and possessing an acid anhydride group as an essential functional group; a compound having a molecular weight of not greater than 5,000 and possessing a hydrolytic silyl group as an essential functional group; and a dissociation catalyst and/or a curing catalyst.

In other words, the present invention provides a curable resin composition containing at least one specific compound, wherein the specific compound is selected from the group consisting of compounds possessing four functional groups: a blocked hydroxyl group (i) which forms a free hydroxy group by easily cleaving thereof by means of water in the atmosphere and an application of heat; epoxy group (ii); acid anhydride group (iii); and hydrolytic silyl group (iv), and wherein the blocked hydroxyl group (i) and epoxy group (ii) are incorporated into a vinyl polymer having a number average molecular weight of not greater than 1,500, the acid anhydride group (iii) is incorporated into a vinyl polymer having a number average molecular weight of not greater than 1,500 or an acid anhydride (in the present invention, these polymers and monomeric compounds are both referred to as "compound") having a number average molecular weight of not greater than 1,500, and the hydrolytic silyl group is incorporated into a vinyl polymer having a number average molecular weight of not greater than 5,000 or a hydrolytic silyl group-containing compound (in the present invention, these polymers and monomeric compounds are both referred to as "compound") having a number average molecular weight of not greater than 5,000.

The present invention also provides a paint employing, as a binder, a curable resin composition containing at least one specific compound, wherein the specific compound is selected from the group consisting of compounds possessing four functional groups: a blocked hydroxyl group (i) which forms a free hydroxy group by easily cleaving thereof by means of water in the atmosphere and an application of heat; epoxy group (ii); acid anhydride group (iii); and hydrolytic silyl group (iv), and wherein the blocked hydroxyl group (i) and epoxy group (ii) are incorporated into a vinyl polymer having a number average molecular weight of not greater than 1,500, the acid anhydride group (iii) is incorporated into a vinyl polymer having a number average molecular weight of not greater than 1,500 or an acid anhydride having a number average molecular weight of not greater than 1,500, and the hydrolytic silyl group is incorporated into a vinyl polymer having a number average molecular weight of not greater than 5,000 or a hydrolytic silyl group-containing compound having a number average molecular weight of not greater than 5,000.

The present invention also provides a coat-finishing method for applying to a material to be coated, a paint employing a curable resin composition as a binder, which is characterized in comprising a coating method for coating paint according to a 1-coat • 1-bake system, 2-coat • 1-bake system, 2-coat • 2-bake system, 3-coat • 2-bake system, and overcoat system; the curable resin composition containing at least one specific compound, wherein the specific compound is selected from the group consisting of compounds possessing four functional groups: a blocked hydroxyl group (i) which forms a free hydroxy group by easily cleaving thereof by means of water in the atmosphere and an application of heat; epoxy group (ii); acid anhydride group (iii); and hydrolytic silyl group (iv), and wherein the blocked hydroxyl group (i) and epoxy group (ii) are incorporated into a vinyl polymer having a number average molecular weight of not greater than 1,500, the acid anhydride group (iii) is incorporated into a vinyl polymer having a number average molecular weight of not greater than 1,500 or an acid anhydride having a number average molecular weight of not greater than 1,500, and the hydrolytic silyl group is incorporated into a vinyl polymer having a number average molecular weight of not greater than 5,000 or a hydrolytic silyl group-containing compound having a number average molecular weight of not greater than 5,000.

In other words, more concretely, the invention attempts to provide a curable resin composition of a high solid content which incorporates 1~100 parts by weight of a compound (A) possessing a blocked hydroxyl group and having an average molecular weight of not greater than 1,500; 0~99 parts by weight of a compound (B) having a molecular weight of not greater than 1,500 and possessing an epoxy group as an essential functional group; 0~99 parts by weight of a compound (C) having a molecular weight of not greater than 1,500 and possessing an acid anhydride group as an essential functional group; 0~99 parts by weight of a compound (D) having a molecular weight of not greater than 5,000 and possessing a hydrolytic silyl group as an essential functional group; and an effective amount of a dissociation catalyst and/or a curing catalyst (E) to a resin composition comprising at least one type of resin and possessing a blocked hydroxyl group, epoxy group, acid anhydride group and hydrolytic silyl group as essential functional groups.

In addition, the inventors of the present invention are attempting to provide a high solid content-type paint employing, as an essential component of a binder, a curable resin composition of a high solid content which comprises a resin composition comprising at least one type of resin possessing a blocked hydroxyl group and, in addition, a resin composition formed from at least one type of resin possessing an acid anhydride group, epoxy group and hydrolytic silyl group as essential functional groups; the curable resin composition incorporates 1~100 parts by weight of a compound (A) possessing blocked hydroxyl group and having an average molecular weight of not greater than 1,500; 0~99 parts by weight of a compound (B) having a molecular weight of not greater than 1,500 and possessing an epoxy group as an essential functional group; 0~99 parts by weight of a compound (C) having a molecular weight of not greater than 1,500 and possessing an acid anhydride group as an essential functional group; 0~99 parts by weight of a compound (D) having a molecular weight of not greater than 5,000 and possessing a hydrolytic silyl group as an essential functional group; and an effective amount of a dissociation catalyst and/or a curing catalyst (E).

Furthermore, the present invention attempts to provide a coat-finishing method for coat-finishing, as a top coat, a paint employing a curable resin composition as a binder, which is characterized in comprising a coating method for coating paint according to a 1-coat • 1-bake system (1C-1B), 2-coat • 1-bake system (2C-1B), 2-coat • 2-bake system (2C-2B), 3-coat • 2-bake system (3C-2B), and overcoat system wherein, the curable resin composition of a high solid content comprises a resin composition comprising at least one type of resin possessing a blocked hydroxyl group and, in addition, a resin composition formed from at least one type of resin possessing an acid anhydride group, epoxy group and hydrolytic silyl group as essential functional groups; the aforementioned curable resin composition incorporates 1~100 parts by weight of a compound (A) possessing blocked hydroxyl group and having an average molecular weight of not greater than 1,500; 0~99 parts by weight of a compound (B) having a molecular weight of not greater than 1,500 and possessing an epoxy group as an essential functional group; 0~99 parts by weight of a compound (C) having a molecular weight of not greater than 1,500 and possessing an acid anhydride group as an essential functional group; 0~99 parts by weight of a compound having a molecular weight of not greater than 5,000 and possessing a hydrolytic silyl group as an essential functional group; and an effective amount of a dissociation catalyst and/or a curing catalyst (E).

In the following, the present invention will be described in greater detail.

In the present invention, the term "blocked hydroxyl group" means a hydroxyl group which is blocked by a so-called blocking agent having various kinds of structure such as one represented, in particular, by the following general formulae (I), (II) and (III), and is easily cleaved to form a free hydroxyl group by means of water in the atmosphere and an application of heat.

As this type of blocking agent, the following compounds can be mentioned when listing only particularly representative examples. Generally known blocking agents possessing groups in a structure as shown by general formula (I) include so-called "silylation agents" such as tert-butyldimethylchlorosilane, tert-butyldiphenylchlorosilane, chloromethyltrimethylsilane, n-butyldimethylchlorosilane, trimethyl chlorosilane, and the like.

In addition, particularly representative examples of generally known blocking agents possessing groups in a structure as shown by general formula (II) include alkyl- through arylvinylethers such as alkylethylvinylether, n-butylvinylether, isobutylvinylether, cyclohexylvinylether, and the like.

Furthermore, particularly representative examples of generally known blocking agents possessing groups in a structure as shown by general formula (III) include unsaturated bond-containing ester rings such as 2,3-dihydrofuran, 2,3-dihydropyrone and the like.

Vinyl polymer (A), which can be regarded as the first component comprising the curable resin composition of the present invention, having an average molecular weight of not greater than 1,500 and possessing a blocked hydroxyl group is selected from the group consisting of: compound (a-1) possessing a blocked hydroxyl group; and further compound (a-2) possessing an acid anhydride group; compound (a-3) possessing an epoxy group; compound (a-4) possessing a hydrolytic silyl group; compound (a-5) possessing an epoxy group and a hydrolytic silyl group; compound (a-6) possessing an epoxy group and an acid anhydride group; compound (a-7) possessing a hydrolytic silyl group and an acid anhydride group; and compound (a-8) possessing an epoxy group, acid anhydride group, and hydrolytic silyl group, in addition to this blocked hydroxyl group as essential functional group(s). This vinyl polymer will be mentioned in the following.

For example, this compound (A) indicates various compounds each with a structure represented by one of general formulae (I)–(III).

Namely, this compound (A) indicates a compound (a-1) possessing a blocked hydroxyl group as an essential functional group; and further compound (a-2) possessing an acid anhydride group; compound (a-3) possessing an epoxy group; compound (a-4) possessing a hydrolytic silyl group; compound (a-5) possessing an epoxy group and a hydrolytic silyl group; compound (a-6) possessing an epoxy group and an acid anhydride group; compound (a-7) possessing a hydrolytic silyl group and an acid anhydride group; and compound (a-8) possessing an epoxy group, acid anhydride group, and hydrolytic silyl group, in addition to this blocked hydroxyl group as essential functional group(s). In other words, this compound (A) indicates a compound possessing a structure represented by one of the following general formulae:

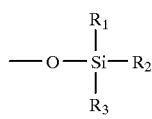

(In the formula, $R_1$ and $R_2$ may be the same or different groups and represent a $C_{1-18}$ alkyl group, phenyl group, or aryl group, or a hydrogen atom, chloride atom, or fluoride atom; $R_3$ represents a $C_{1-18}$ alkyl group, phenyl group, or aryl group.)

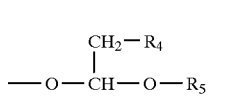

(In the formula, $R_4$ represents a hydrogen atom or a $C_{1-10}$ alkyl group; and R5 represents a $C_{1-22}$ alkyl group with at least one type of atomic group as a substituent selected from the group consisting of cycloalkyl group, aralkyl group, aryl group, alkoxy group, alkanoyloxy group, $C_{1-18}$ alkyl group, and a halogen atom.)

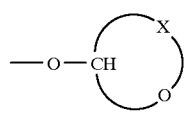

(In the formula, X represents a $C_{1-18}$ alkyl group possessing at least one type of atomic group as a substituent selected from the group consisting of alkoxy group, arylalkyl group, aryl group, aryloxy group, alkanoyloxy group, $C_{1-10}$ alkyl group, and a halogen atom.).

Particularly representative examples of the monomer shown by the aforementioned general formula (I) include trimethylsiloxyethyl(meth)acrylate, trimethylsiloxypropyl (metha)-acrylate, trimethylsiloxybutyl(meth)acrylate, triphenylsiloxyalkyl (meth)acrylates, and dimethyltert-butylsiloxyalkyl(meth)acrylates.

In other words, the aforementioned compound is a compound in which the hydrogen atoms of the hydroxyl group within the hydroxyl group-containing polymerizable unsaturated monomer have been blocked by means of the so-called silylation agent (i.e., a blocked hydroxyl group-containing unsaturated monomer). Needless to say, this compound is not limited to just the monomers cited above.

Namely, it is possible to employ a compound formed by means of reacting ε-caprolactone with N-methylolated (meth)acrylamide, β-hydroxyethyl(meth)acrylate, and the like through an addition reaction, or a compound formed by means of silylating various (meth)acrylates introduced from polyoxyalkylene glycols.

Particularly representative examples of the monomer shown by the aforementioned general formula (II) include various 1-alkoxy-ethoxyethyl(meth)acrylates such as 1-methoxy-ethoxyethyl-(metha)acrylate, 1-ethoxy-ethoxyethyl(meth)acrylate, 1-butoxy-ethoxyethyl(meth) acrylate, 1-(2-ethylhexanoxy)-ethoxyethyl(metha)-acrylate, 1-isobutoxy-ethoxyethyl(meth)acrylate, 1-cyclohexyloxy-ethoxyethyl(meth)acrylate and the like, i.e., a compound formed by means of reacting alkylvinylethers with the hydrogen atoms of the hydroxyl group within the hydroxyl group-containing polymerizable unsaturated monomer in an addition reaction. However, this compound is not just limited to the aforementioned monomers.

Namely, it is possible to employ a compound formed by means of reacting ε-caprolactone with N-methylolated (meth)acrylamide, β-hydroxyethyl(meth)acrylate, and the like through an addition reaction; or a compound formed by means of reacting various vinylethers with various (meth) acrylates such as polyoxyalkylene glycols and the like through an addition reaction.

Furthermore, particularly representative examples of the monomer shown by the aforementioned general formula (III) include the following compounds represented by general formulae (III-1)~(III-4):

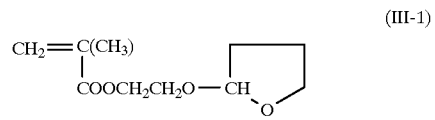

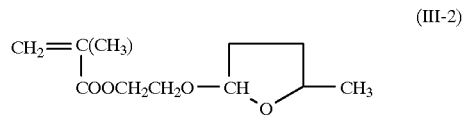

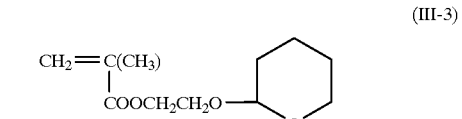

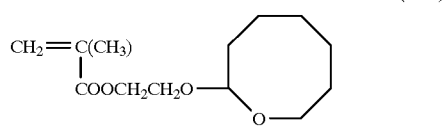

In general formula (III), the number of carbon atoms X is normally within the range of 1~18, and preferably within the range of 2~6.

The appropriate usage amount of these various monomers in which hydroxyl groups are blocked is in the range of 1.5 mol/1,000 g~3 mol/1,000 g. In the case when this usage amount is less than 1.5 mol/1,000 g, the resultant viscosity reduction effect is easily decreased; while, on the other hand, when this usage amount is exceedingly large, i.e., exceeds 3 mol/1,000 g, a disadvantage is generated in that the volatile component from the blocking agent is increased to a greater extent than the reduction in the viscosity. Hence, both of these aforementioned cases are undesirable.

As functional groups other than the blocked hydroxyl group within the molecule, at least one group selected from the group consisting of acid anhydride group, epoxy group, and hydrolytic silyl can be jointly used.

In the case when compound (A) having a molecular weight of not greater than 1500 and possessing blocked hydroxyl group as an essential functional group, is compound (a-2), which also possesses an acid anhydride group, it is possible to produce this aforementioned compound (a-2) by, for example, using an unsaturated monomer possessing an acid anhydride group (acid anhydride containing unsaturated monomer) which can be introduced by means of copolymerization with the aforementioned blocked hydroxyl group-containing unsaturated monomer. Particular representative examples of this acid anhydride group-containing unsaturated monomer includes various compounds such as itaconic anhydride, maleic anhydride, methacrylic anhydride, and the like.

In addition, this compound can be obtained by means of a cyclization reaction from a monocarbonate copolymer represented by monoalkyl ester malate, monoalkyl ester itaconate, and the like using a dealcoholation reaction.

The usage amount for these acid anhydride group-containing unsaturated monomers is appropriately within the range of 1.5 mol/1,000 g~3 mol/1,000 g. Since these compounds can be easily reacted with regenerated hydroxyl groups, a proportion in which approximately equivalent mole amounts are employed is preferred.

In the following, the case in which compound (A) having a molecular weight of not greater than 1,500 and possessing blocked hydroxyl group as an essential functional group, is compound (a-3), which also possesses an epoxy group, will be explained. As the process for introducing the epoxy group, a process in which an epoxy group-containing polymerizable unsaturated monomer and the aforementioned hydroxyl group block containing unsaturated monomer are copolymerized is in particular recommended. Particularly representative examples of this epoxy group-containing polymerizable unsaturated monomer includes glycidyl (meth)acrylate, reaction products of isocyanate ethyl(meth) acrylate, and glycidol, (meth)acryloyloxymethyl-3,4-epoxycyclohexane, vinyl cyclohexene monoepoxide, and the like. As a basic rule, this aforementioned compound (A) is formed by means of copolymerizing these aforementioned epoxy group-containing polymerizable unsaturated monomers and various copolymerizable unsaturated monomers.

In the following, compound (a-4) possessing both blocked hydroxyl group (hydroxyl group block) and hydrolytic silyl group will be explained. A vinyl copolymer jointly possessing a blocked hydroxyl group and a hydrolytic silyl group can be obtained by means of using an introduction method in which a hydrolytic group-containing vinyl monomer such as γ-(metha)acryloylpropyltrlmethoxysilane, γ-(metha)acryloyloxypropylmethyldimethoxysilane, γ-(metha)-acryloyloxypropenyloxysilane, γ-(metha)acryloyloxypropyltriiminooxy silane, vinyltrimethoxysilane, vinyltriethoxysilane, vinyl(tris-β-methoxyethoxy)silane, vinylacetoxysilane, and the like; β-3, 4-epoxycyclohexyl methanol; ester compounds of (meth)acrylic acid; and hydroxyl group block group-containing unsaturated monomers are copolymerized.

In the following, the case in which compound (A) having a molecular weight of not greater than 1,500 and possessing as an essential functional group a blocked hydroxyl group, is compound (a-5) possessing, in addition, an epoxy group and a hydrolytic silyl; the case in which vinyl polymer (A) having a molecular weight of not greater than 1,500 and possessing as an essential functional group a blocked hydroxyl group (i), is compound (a-6) possessing, in addition, an epoxy group and an acid anhydride group; the case in which compound (A) having a molecular weight of not greater than 1,500 and possessing as an essential functional group a blocked hydroxyl group (i), is compound (a-7) possessing, in addition, an epoxy group, acid anhydride group, and hydrolytic silyl group; and the case in which compound (A) having a molecular weight of not greater than 1,500 and possessing as an essential functional group a blocked hydroxyl group (i), is compound (a-8) possessing, in addition, a hydrolytic silyl group and acid anhydride group will be explained concretely. These aforementioned compounds are formed by means of an extremely simple process in which the aforementioned hydroxyl group block-containing unsaturated monomer, epoxy group-containing polymerizable unsaturated monomer, and hydrolytic silyl group-containing unsaturated monomer; the aforementioned hydroxyl group block-containing unsaturated monomer, epoxy group-containing unsaturated monomer, and acid anhydride group-containing unsaturated monomer; the aforementioned hydroxyl group block-containing unsaturated monomer, hydrolytic silyl group-containing unsaturated monomer, and acid anhydride group-containing unsaturated monomer; and the aforementioned hydroxyl group block-containing unsaturated monomer, epoxy group-containing polymerizable unsaturated monomer, hydrolytic silyl group-containing polymerizable unsaturated monomer, and acid anhydride group-containing polymerizable unsaturated monomer are respectively copolymerized.

Particularly representative examples of monomers which can be polymerized with the aforementioned monomers as a polymerizable unsaturated monomer possessing, as essential functional group(s), hydroxyl group block group, and additionally, as needed, an epoxy group, acid anhydride group, and/or hydrolytic silyl group includes: various alkyl (meth)acrylates, i.e., ester compounds of $C_{1-22}$ monovalent alcohols and (meth)acrylic acids; various esters of (meth) acrylic acids such as styrene, vinyl toluene, tert-butyl styrene, 2-ethoxy(meth)acrylate, (meth)acrylnitrile, cyclohexyl(meth)acrylate, and the like; diesters formed from $C_{1-22}$ monovalent alcohols, and either maleic acid or fumaric acid; acryl amides such as (meth)acrylamide, (meth) dimethylacrylamide, and the like: haloolefins such as vinylacetate, hexafluoropropylene, tetrafluoroethylene, and the like; perfluoroalkyl-perfluorovinyl ethers such as trifluoromethyltrifluorovinyl ether, pentafluoroethyltrifluoro-vinyl ether, and the like; (per)fluorovinyl ethers, perfluoroalkylvinyl ethers (note: the number of carbon atoms of the alkyl groups is within the range of 1–18), and the like. In addition, according to the desired properties of the film layer, these various vinyl monomers can also be used in combinations of two or more.

The number average molecular weight of the acryl oligomer (A), i.e., the vinyl polymer, obtained by copolymerizing the aforementioned components, is no greater than 1,500, and preferably within the range of 100~1,500, and more preferably within the range of 700~1,200. In the case when this molecular weight exceeds 1,500, the solubility or viscosity in a solventless state increases, which is then accompanied by a drastic increase in the amount of diluting solvent, both of which are undesirable.

The polymerization of these various monomers can be performed by means of conventional methods. Preferably, this polymerization can be easily performed by means of radical solution polymerization.

As this aforementioned method for producing a low molecular weight polymer, a method employing chain transfer agents such as various mercaptan compounds including mercaptoethanol, thioglycerol, lauryl mercaptan, and the like, as well as various methods which conduct the reaction at high temperatures (normally within the approximate range of 140~180° C.), or at low monomer concentrations, can be mentioned. By means of any of these methods, the aforementioned low molecular weight polymer can be easily obtained.

In the aforementioned, particularly representative examples of the solvent include xylene, "SORBESSO" (product name; aromatic hydrocarbon solvent produced by Exxon Corporation), butyl acetate, methylethyl ketone, methylamyl ketone, butyl acetate, ethyl acetate, and the like, as solvents normally employed in the manufacture of acryl-type polymers.

In the case when a radical polymerization initiator is normally used, any such compound can be employed;

however, particularly representative examples include peroxides such as benzoyl peroxide, lauryl peroxide, tert-butylhydroperoxide, tert-butyl-oxy-2-ethyl hexanoate, tert-amylperoxy-2-ethylhexanoate, tert-amylperoxybenzoate, and the like; or azobisisobutylonitrile, azobis(2-methylpropionitrile), and the like.

In addition, methods in which so-called "ion polymerization" is carried out, such as anion polymerization and cation polymerization are, in particular, advantageous in the copolymerization of monomers possessing a blocked hydroxyl group.

Moreover, the resultant acryl oligomer (a-1) possessing a blocked hydroxyl group, as well as acryl oligomer (a-2), acryl oligomer (a-3), acryl oligomer (a-4), acryl oligomer (a-5), acryl oligomer (a-6), acryl oligomer (a-7), and acryl oligomer (a-8), respectively possessing at least one group selected from the group consisting of acid anhydride group, epoxy group, and hydrolytic silyl group in addition to the aforementioned blocked hydroxyl group can be employed as a stable component of the curable resin composition, more specifically, the curable resin composition of a high solid content, and paint, more specifically, high-solid content-type paint according to the present invention without having to reproduce hydroxyl groups.

In the following, compound (B), which can be regarded as the second component constituting the curable resin composition of the present invention, having a number average molecular weight of not greater than 1,500 and possessing, as an essential functional group, an epoxy group will be concretely explained in the case when this compound is selected from the group consisting of compound (b-1) possessing an epoxy group; and additionally compound (b-2) possessing an acid anhydride group; compound (b-3) possessing a hydrolytic silyl group; and compound (b-4) possessing an acid anhydride group and hydrolytic silyl group, in addition to the aforementioned epoxy group.

The following compounds can be mentioned as compound (b-1) possessing at least one epoxy group as an essential functional group, and furthermore, compound (b-2), compound (b-3), and compound (b-4) possessing an acid anhydride group and/or hydrolytic silyl group in addition to the aforementioned epoxy group as essential functional groups.

With regard to jointly possessing an epoxy group and a blocked hydroxyl group, it is also possible to consider compound (a-3) cited above as a first component, as a compound identical to the aforementioned compound (b-1).

In the case when compound (B) having a molecular weight of not greater than 1,500 and possessing an epoxy group as an essential functional group, is compound (b-2) possessing an acid anhydride group in addition to the aforementioned epoxy group, this compound (b-2) can be easily obtained by means of copolymerizing a copolymerizable unsaturated monomer as mentioned above, with an epoxy group-containing polymerizable unsaturated monomer and an acid anhydride group-containing polymerizable unsaturated monomer as essential components.

Particularly representative compounds in the case when compound (B) having a molecular weight of not greater than 1,500 and possessing an epoxy group as an essential functional group. is compound (3) possessing in addition a hydrolytic silyl group include the following: alicyclic epoxy group and hydrolytic silyl group-containing compounds shown respectively by means of general formulae (IV) and (V).

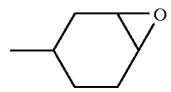

(IV)

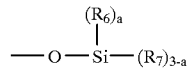

(V)

(In the formulae, $R_6$ represents a hydrogen atom, or a monovalent organic group such as an alkyl group, aryl group, or arylalkyl group; $R_7$ represents a halogen atom, alkoxy group, acyloxy group, phenoxy group, iminoxy group, or alkenyloxy group; and a represents a natural number of 0, 1, or 2.)

Concretely, particular representative examples of this compound include β-3,4-epoxycyclohexylethyltrimethoxysilane, β-3,4-epoxycyclohexylethyltriethoxysilane, γ-isocyanate propyltrimethoxysilane, as well as additives of γ-isocyanate propyltriisopropenyloxysilane, and β-3,4-epoxycyclohexylethanol and the like.

In addition, the vinyl polymer possessing an epoxy group and hydrolytic silyl group as essential functional groups (epoxy group and hydrolytic silyl group-containing vinyl copolymer) can be obtained by means of copolymerizing various hydrolytic silyl group-containing vinyl monomers such as γ-(meth)acryoyoxyptropiyxtrimethoxysailane, γ-(meth)acryloyloxypropylmethyldimethoxysilane, γ-(meth) acryloyloxypropyltriisopropanyloxysilane, γ-(meth)acryloyloxypropyltriimino-oxysilane, vinyltrimethoxysilane, vinyltriethoxysilane, vinyl(tris-β-methoxyethoxy)silane, vinyltriacetoxysilane and the like, with an alicylic epoxy group-containing polymerizable unsaturated monomer such as ester compounds of β-3,4-epoxycyclohexylmethanol and (meth) acrylic acid, and furthermore, when necessary, copolymerizing the aforementioned with another monomer which can be copolymerized with the aforementioned monomers.

Particularly representative examples of a compound jointly possessing a glycerol group as an epoxy group and a hydrolytic silyl group include additives of γ-glycidoxypropyltrimethoxysilane, γ-glycidoxypropyltriethoxysilane, γ-glycidoxypropylmethyldiethoxy-silane, γ-glycidoxypropyltriisopropenyloxysilane, γ-glycidoxypropyltri-iminooxysilane, γ-isocyanate propyltrimethoxysilane, and glycidol; or additives of γ-aminopropyltrirnethoxysilane and diepoxy compounds.

In addition, the aforementioned vinyl copolymer jointly possessing an epoxy group and a hydrolytic silyl group can be obtained by means of copolymerizing a glycidyl group-containing polymerizable monomer and the aforementioned hydrolytic silyl group-containing polymerizable monomer, and furthermore, as necessary, copolymerizing these monomers with another copolymerizable monomer.

Particularly representative examples of this glycidyl group-containing monomer include, but are not limited to, glycidyl(meth) acrylate, 1-methylglycidyl(meth)acrylate, and the like.

In the following, the case in which compound (B) having a molecular weight of not greater than 1,500 and possessing an epoxy group as an essential functional group, is compound (b-4) jointly possessing an acid anhydride group and hydrolytic silyl group in addition to the aforementioned epoxy group, will be explained.

Concretely, the easiest way to obtain this aforementioned compound (b-4) is to copolymerize an epoxy group-containing polymerizable unsaturated monomer, and an unsaturated monomer possessing both an acid anhydride group-containing polymerizable unsaturated monomer and a hydrolytic silyl group, and further, when necessary, copolymerizing the aforementioned with another copolymerizable unsaturated monomer.

The number average molecular weight of this compound (B) obtained by copolymerizing the aforementioned components is not greater than 1,500, and preferably, within the approximate range of 100~1,500, and more preferably in the range of 700~1,200. When the molecular weight exceeds 1,500, the viscosity under trace amounts of solvent, or the viscosity in a solventless state drastically increases, which is accompanied by a drastic increase in the amount of diluting agent solvent, both of which are undesirable.

In the following, the case in which compound (C), which can be regarded as the third component constituting the curable resin composition of the present invention, having a number average molecular weight of not greater than 1,500 and possessing an acid anhydride group as an essential functional group, is either compound (c-1) possessing an acid anhydride group as an essential functional group, or compound (c-2) possessing a hydrolytic silyl group in addition to this aforementioned acid anhydride group, will be explained concretely.

Particularly representative examples of these two aforementioned compounds include an acid anhydride group-containing vinyl copolymer formed by means of copolymerizing an acid anhydride group-containing unsaturated monomer and another polymerizable monomer which can be copolymerized with this entity; and a vinyl copolymer jointly possessing an acid anhydride group and hydrolytic silyl group which is obtained by means of copolymerizing an acid anhydride group-containing unsaturated monomer, hydrolytic silyl group-containing unsaturated monomer, and when necessary, another polymerizable monomer which is copolymerizable with the aforementioned compounds.

In addition, the aforementioned acid anhydride group-containing vinyl copolymer can, needless to say, be obtained from a monocarbonate copolymer represented by peresters such as monoalkyl esters of maleic acid and itaconic acid, via a cyclization reaction aided by a dealcoholation reaction.

In the aforementioned, the usage amount of the above acid anhydride-containing monomer is appropriately within the range of 1.0 mol/1000 g~3.0 mol/ 1,000 g. In the case when this usage amount is less than 1.0 mol/1000 g, it is very difficult to obtain a film layer with a sufficient hardness, while on the other hand, in the case when this usage amount exceeds 3.0 mol/1,000 g, there is a fear of ruining the hardened film layer as well as the appearance thereof.

Furthermore, it is also possible to use the following types of acid anhydride group-containing low molecular weight compounds. Namely, among these compounds, particularly representative examples include pyromellitic anhydride, benzophenone tetracarboxylic anhydride, ethylene glycol bis(anhydrotrimellitate), glycerol tris(anhydro)trimellitate, methylhexahydrophthalic anhydride, hexahydrophthalic anhydride, hymic anhydride, itaconic anhydride, and the like.

Compound (c-2) possessing at the same time a hydrolytic silyl group can be easily produced by means of copolymerizing the aforementioned acid anhydride group-containing unsaturated monomer, hydrolytic silyl group containing unsaturated monomer, and when necessary, another monomer which can be copolymerized with the aforementioned.

It is possible for compound (c-1) having a molecular weight of not greater than 1,500 and possessing an acid anhydride group as an essential functional group to be the same compound as the aforementioned compound (a-2) in the case when this compound (c-1) possesses a blocked hydroxyl group.

The number average molecular weight of compound (C) obtained by means of copolymerizing the aforementioned components is not greater than 1,500, and preferably within the range of 100~1,500, and more preferably within the range of 700~1,200. In the case when this molecular weight exceeds 1,500, the viscosity under the presence of trace amounts of solvent, or the viscosity in a solventless state increases dramatically, accompanied by a dramatic increase in the amount of diluting solvent, both of which are undesirable.

In the following, compound (D), which can be regarded as constituting the curable resin composition according to the present invention, having a number average molecular weight of not greater than 5,000 and possessing a hydrolytic silyl group as an essential functional group, will be concretely explained. The manufacture of this aforementioned compound (D) can be conducted by means of a particular representative method in which a hydrolytic silyl group-containing unsaturated monomer, and another unsaturated monomer which can be copolymerized with this entity, are copolymerized, resulting in the simple manufacture of compound (D).

The usage amount of the hydrolytic silyl group-containing unsaturated monomer is appropriately within the range of 1.0 mol/1,000 g~3.0 mol/1,000 g. In the case when this usage amount is less than 1.0 mol/1,000 g, it becomes difficult to obtain a coating film with a sufficient hardness; however, on the other hand in the case when this usage amount is exceedingly large, i.e., exceeds 3.0 mol/1,000 g, the hardened coating film becomes exceedingly brittle, which is an undesirable characteristic.

In addition, at this time, various alkyl silicates such as methyl silicate, ethyl silicate, and the like, as well as various reactive silicon oligomers can be employed as the reactive diluent.

Furthermore, it is preferred that a dissociation catalyst and/or curing catalyst (E), which can be regarded as the fifth component, be incorporated into the curable resin composition of the present invention.

These dissociation catalysts and/or curing catalysts (E) promote the reaction between the acid anhydride group and hydroxyl group reproduced by means of hydrolytic reaction with the water component in air; these compounds then promote the reaction between the epoxy group and the resultant carboxyl group.

Needless to say, in order to promote the above hydrolysis, it is necessary to employ a catalyst. Particularly representative examples of a catalyst for promoting the above hydrolysis, as well as catalysts for promoting the reaction between the hydroxyl group and acid anhydride group include acidic catalysts such as phosphoric acids, phosphoric esters, phosphorous esters, unsaturated group-containing phosphoric esters, as well as p-toluene sulfonic acid and amine salts therein; benzoic acid, trichloroacetate, naphthalene disulfonic acid, and salts therein; or various compounds generating halogen ions such as tetraethylammonium fluoride, tetraethylanuonium chloride, and the like.

The amount of each catalyst to be added is appropriately within the range of 0.001~10%, preferably within the range of 0.005~6% with respect to the aforementioned acryl oligomer (A).

Particularly representative examples of the catalyst for promoting the reaction between the aforementioned epoxy group and carboxyl group include various quaternary ammonium salts such as tetramethylammonium fluoride, tetramethylammonium bromide, trimethylbenzylammonium hydroxide, 2-hydroxypyridine, trimethylammonium methoxide, phenyltrimethylammonium chloride, phenyltrimethylammonium bromide, phenyltrimethylammonium hydroxide, phenyltrimethylammonium iodide, phenyltrimethyl ammonium bromide, sodium salts of phosphocholine chloride, stearylammonium bromide, tetra-n-butylammonium hydroxide, tetra-n-butylammonium phosphate, tetra-n-dodecylammonium trichloride, tetraethylammonium hydroxide, tetraethylammoniumtetrafluoroborate, acetylcholine bromide, alkyldimethylbenzylammonium chloride, benzylcholine bromide, benzyl-n-butylammonium bromide, betaine, butyl chloride, bis(tetra-n-butyl ammonium) dichromate, trimethyl vinylammonium bromide, and the like; phosphonium salts such as aryltriphenylphosphonium chloride, n-amyltriphenylphosphonium bromide, benzyltriphenylphosphonium chloride, bromomethyltriphenyl phosphonium bromide, 2-dimethylaminoethyltriphenylphosphonium bromide, ethoxycarbonylphosphonium bromide, n-heptyltriphenyl phosphonium bromide, methyltriphenylphosphonium bromide, tetrakis(hydroxylmethyl)phosphonium sulfate, tetraphenyl phosphonium bromide, and the like; various acid catalysts such as phosphoric acid, p-toluene sulfonic acid, dimethyl sulfuric acid and the like; various basic catalysts such as 1,8-diazobicyclo(5,4,0)undecene-7, or 1,4-diazobicyclo(2,2,2) octane, and the like; and various carbonates such as calcium carbonate and the like.

The usage amount of the aforementioned dissociation catalyst and/or curing catalyst (E), with respect to 100 parts by weight of solid content of the aforementioned acryl oligomer (A), compound (B), compound (C), and compound (D), is appropriately 0.01~10 parts by weight. and preferably 0.1~5 parts by weight.

The usage amount of the aforementioned catalysts and or curing catalysts (E) is a major factor in determining the baking temperature at the time of forming the coating film using the curable resin composition of the present invention. In particular; when this aforementioned usage amount is less than 0.01 parts by weight, it is difficult for the cross-linking reaction to progress in a sufficient manner; on the other hand, when this aforementioned amount is exceedingly large, i.e., exceeds 10 parts by weight, the storage stability of the thermosetting resin composition, as well as the water resistance of the coating layer show excessive degradation, and hence both of the aforementioned cases are undesirable.

Furthermore, as necessary additives ranging from various resins, solvents, coloring agents such as pigments and dyes, as well as flow conditioners, antioxidants, ultraviolet ray absorbents, light stabilizing agents, silane coupling agents and the like which are conventionally used may also be added to the curable resin composition, paint, curable resin composition possessing high solid content, or high solid content-type paint according to the present invention (hereinafter, there are cases in which these compounds represent a resin composition, or alternatively, a paint). In particular, use of a bipolar non-protonic solvent with high water absorbing properties as the aforementioned solvent is particularly effective.

In the following, the coat-finishing method according to the present invention will be explained.

The coat-finishing method according to the present invention is a coating method for coating paint in a 1C-1B system, 2C-1B system, 2C-2B system, 3C-2B system, and over coat system. More concretely, this coat-finishing method coats a high solid content-type paint using the curable resin composition of the present invention as a binder onto an object to be coated.

In the present invention, the results can be further improved by means of using a water base paint as the base coat for use in 1C-1B system, 2B-2B system, 2C-2B system, 2C-2B system, and 3B-2B system, and in particular, as the base coat for use in 2B-1B system or 3C-2B system. The aforementioned water base paint is not in particular limited, so long as a compound possessing the properties of water solubility and/or water dispersibility is employed; however, compounds with low amounts of incorporated organic solvents are particularly preferred.

At this time, use of a cross-linking agent will never hinder the reaction. For example, in the case when the resin composition possesses a hydroxyl group, use of a block polyisocyanate compound or amino resin is preferred; in the case when the resin composition possesses an epoxy group, use of a carboxyl group-containing resin or polycarboxylic acid is preferred; in the case when the resin composition possesses a carboxylic group, use of a resin possessing at least two epoxy groups per molecule is preferred.

With regard to the conditions at the time of coating, the coating can be conducted by heating the resin composition or paint according to the present invention, blending the components of the resin composition according to the present invention, i.e., acryl oligomer (A), compound (B), compound (C), compound (D), dissociation catalyst and/or curing catalyst (E) just prior to usage by means of an air atomization coating method, airless coating method, or the like. When heating either the resin composition or paint, a temperature of 100° C. or less is, in particular, preferred.

It is also possible to combine various conventional additives such as a leveling agent, ultraviolet ray absorbent, and the like, as well as a plasticizer to the resultant paint composition.

The curable resin composition and paint of the present invention more concretely, the curable resin composition possessing a high solid content, and high solid content-type paint, as well as the paint coat-finishing method of the present invention can be appropriately applied to so-called "metal raw materials" or "metal products" such as vehicles and construction materials.

The curable resin composition and paint of the present invention are advantageous in that they possess an extremely high utility, wherein low temperature curing and reduction of the viscosity are possible, in addition to improving the acid and abrasion resistances. Moreover, in the aforementioned resin composition and paint, air bubbles and drip runs are not generated.

In addition, by means of coat-finishing the high solid content-type paint employing the curable resin composition of the present invention as a binder onto the material to be coated according to the coat-finishing method of the present invention, it is possible to achieve, for the first time, superior characteristics such as the aforementioned acid and abrasion resistances. Consequently, the coating film obtained by means of the coat-finishing method of the present invention is useful as the top coat of a vehicle and possesses superior resistance to acid, solvent, weather and abrasion.

EXAMPLES

In the following, the present invention will be more concretely explained using the reference examples, examples, applied examples and comparative examples. However, the present invention is by no means limited to these examples. Furthermore, in the following, unless otherwise noted, parts and % all are based on the parts by weight standard.

Reference Example 1
(Preparation Example of an acryl oligomer possessing a blocked hydroxyl group)

1,200 parts of xylene were added to a four-mouth flask equipped with an agitating device, inactive gas introduction port, thermometer and condenser, and the temperature was raised to 140° C.

A mixture formed from 250 parts of 1-ethoxy-ethoxyethyl-methacrylate, 50 parts of styrene, 100 parts of 2-ethylhexylacrylate, and 100 parts of n-butylmethacrylate, and a mixture formed from 300 parts of xylene and 75 parts of tert-butylperoxy-2-ethylhexanoate were then added dropwise over 7 hours.

Furthermore, at the same temperature, the reaction was allowed to continue for 5 hours to produce a resin solution with a non-volatile content of 25%. Subsequently, the xylene was removed under reduced pressure. The viscosity at 25° C. of the resultant resin solution was 1,950 centipoise (cps), and the number average molecular weight of the resin was 1,100. Hereafter, this resin will be abbreviated as resin (a-1-1).

Reference Example 2

(Manufacturing Example of an acryl oligomer jointly possessing a blocked hydroxyl group and acid anhydride group)

The desired resin was produced according to the same process as in Reference Example 1 except that a monomer mixture of 100 parts of styrene, 100 parts of trimethylsiloxybutylacrylate, 65 parts of maleic anhydride and 135 parts of 2-ethylhexylacrylate was added to 1,300 parts of xylene.

The non-volatile content of the resultant resin solution was 27.8%, the viscosity of the resin after removal of the solvent was 2,200 cps, and the molecular weight was 1,150. Hereafter, this resultant resin will be abbreviated as resin (a-2-1).

Reference Examples 3~29

Various acryl oligomers possessing various molecular weights were manufactured according to the same process as in Reference Example 1, with the exception of the proportions of the monomer mixture and catalyst mixture which were as shown in the following Tables 1 (1)~(8).

In addition, a metallic base coat was produced using "ACRYDIC 47-712" (product name; hydroxyl group-containing acryl resin manufactured by Dai Nippon Ink and Chemicals Inc.), "SUPER BECKAMIN L-117-60" and "ALPASTE 7160NS" (product names; aluminum pastes manufactured by Toyo Aluminum Co., Ltd.), "FASTGEN SUPER RED BN" (product name; manufactured by Dai Nippon Ink and Chemicals Inc.), as base coat (I). At this time, the pigment weight content (PWC) of the metal aluminum was 13% while the PWC of the red pigment was 15%.

Furthermore, a metallic base coat was also obtained using a hydroxyl group-containing vinyl copolymer emulsion produced by conventional process with a non-volatile content of 40% and a composition of styrene: methylmethacrylate: n-butylacrylate: methacrylic acid: 2-hydroxypropylmethacrylate=10:35:48:2:5 (parts by weight mixture ratio); "CYMEL C-325" (product name; methyl esterated melamine resin manufactured by Mitsui Cyanamide); "PRYMAL ASE-60" and "ALPASTE WZ7160" (product names; aluminum pastes manufactured by Toyo Aluminum Co., Ltd.), as base coat (II).

TABLE 1(1-1)

| | Reference Example 1 | Reference Example 2 | Reference Example 3 | Reference Example 4 |
|---|---|---|---|---|
| Name of incorporated functional group | B—OH | B—OH Acid anhydride group | B—OH Epoxy group | B—OH Silyl group |
| 1-EEEMA | 250 | | | |
| TMSBA | | 100 | 200 | 250 |
| GMA | | | 100 | |
| maleic anhydride | | 65 | | |
| A-174 | | | | 200 |
| Styrene | 50 | 100 | 50 | 50 |
| Butylmethacrylate | 100 | | 150 | |
| 2-EHA | 100 | 135 | | |

Footnotes for Table 1(1-1)
1-EEEMA . . . 1-ethoxy-ethoxymethacrylate
TMSBA . . . trimethylsiloxybutylacrylate
GMA . . . glycidylmethacrylate
A-174 . . . methacryloyloxypropyltrimethoxysilane
2-EHA . . . 2-ethylhexylacrylate
B—OH . . . block hydroxyl group
Silyl group . . . hydrolytic silyl group

TABLE 1(1-2)

| | Reference Example 1 | Reference Example 2 | Reference Example 3 | Reference Example 4 |
|---|---|---|---|---|
| Xylene | 1200 | 1300 | 1200 | 1200 |
| AIBN | | 10 | | 5 |
| P—O | 75 | 80 | 100 | 70 |
| Xylene | 300 | 300 | 300 | 300 |
| Compound name* | a-1-1 | a-2-1 | a-3-1 | a-4-1 |
| Mn | 1100 | 1150 | 1050 | 950 |
| Mw | 2150 | 2200 | | 1800 |

Footnotes for Table 1(1-2)
AIBN . . . Azobisisobutylonitrile
P—O . . . tert-butyl per-2-ethylhexanoate
Mn . . . number average molecular weight
Mw . . . weight-average molecular weight
*The compound name changes according to the example, i.e., "a-1-1" in Reference Example 1, "a-2-1" in Reference Example 2, "a-3-1" in Reference Example 3, and "a-4-1" in Reference Example 4.

TABLE 1(2-1)

| | Reference Example 5 | Reference Example 6 | Reference Example 7 | Reference Example 8 |
|---|---|---|---|---|
| Name of incorporated functional group | B—OH EP group Silyl group | B—OH EP group Acid anhydride group | B—OH Silyl group Acid anhydride group | B—OH Acid anhydride group EP group Silyl group |
| 1-EEEMA | 150 | 150 | | 100 |
| TMSBA | | | 101 | 150 |
| GMA | 100 | 50 | | 50 |
| maleic anhydride | | 70 | 100 | 70 |
| A-174 | 100 | | 50 | 100 |
| Styrene | 150 | 150 | 150 | 30 |
| n-butylmethacrylate | | | 199 | |
| n-butylacrylate | | 30 | | |

Footnotes for Table 1(2-1)
EP group . . . epoxy group
M-100 . . . alicyclic epoxy group-containing methacrylate (product of Dicell Chemical Industries, K.K.)

TABLE 1(2-2)

|  | Reference Example 5 | Reference Example 6 | Reference Example 7 | Reference Example 8 |
|---|---|---|---|---|
| Xylene | 1250 | 1250 | 1500 | 1200 |
| AIBN | 30 | 30 |  | 10 |
| P—O | 50 | 50 | 120 | 55 |
| Xylene | 300 | 300 | 400 | 400 |
| Compound name* | a-5-1 | a-6-1 | a-7-1 | a-8-1 |
| Mn | 1050 | 880 | 950 | 1150 |
| Mw | 1800 | 1750 | 1800 | 2200 |

Footnotes for Table 1(2-2)
*The compound name changes according to the example, i.e., "a-5-1" in Reference Example 5, "a-6-1" in Reference Example 6, "a-7-1" in Reference Example 7, and "a-8-1" in Reference Example 8.

TABLE 1(3-1)

|  | Reference Ex. 9 | Reference Ex. 10 | Reference Ex. 11 | Reference Ex. 12 |
|---|---|---|---|---|
| Name of incorporated functional group | B—OH EP group Silyl group | EP group Acid anhydride group | EP group Silyl group | EP group Silyl group Acid anhydride group |
| 1-EEEMA | 150 |  |  |  |
| GMA | 210 | 140 | 140 | 140 |
| maleic anhydride |  | 100 |  | 100 |
| A-174 | 100 |  | 200 | 100 |
| Styrene | 100 | 120 | 100 |  |
| n-BMA |  | 100 |  | 100 |
| n-BA | 90 |  | 60 |  |
| 2-EHA | 50 | 40 |  | 60 |

Footnotes for Table 1(3-1)
n-BMA . . . n-butylmethacrylate
n-BA . . . n-butyl acrylate

TABLE 1(3-2)

|  | Reference Ex. 9 | Reference Ex. 10 | Reference Ex. 11 | Reference Ex. 12 |
|---|---|---|---|---|
| Xylene | 1200 | 1200 | 1100 | 1200 |
| AIBN | 15 | 5 |  | 5 |
| P—O | 80 | 90 | 60 | 85 |
| Xylene | 350 | 300 | 400 | 300 |
| Compound name* | b-1-1 | b-2-1 | b-3-1 | b-4-1 |
| Mn | 1100 | 1220 | 900 | 1000 |
| Mw | 2130 | 2600 | 1700 | 1950 |

Footnotes for Table 1(3-2)
*The compound name changes according to the example, i.e., "b-1-1" in Reference Example 9, "b-2-1" in Reference Example 10, "b-3-1" in Reference Example 11, and "b-4-1" in Reference Example 12.

TABLE 1(4-1)

|  | Reference Ex. 13 | Reference Ex. 14 | Reference Ex. 15 | Reference Ex. 16 |
|---|---|---|---|---|
| Name of incorporated functional group | Acid anhydride group | Acid anhydride group | Silyl group | B—OH Acid anhydride group |
| TMSBA |  |  |  | 100 |
| maleic anhydride | 150 | 150 |  | 65 |
| itaconic anhydride | 150 |  |  |  |
| A-174 |  | 150 | 200 |  |
| Styrene | 130 | 130 | 50 | 100 |
| n-BMA |  |  | 170 | 50 |
| n-BA | 170 |  |  |  |
| 2-EHA |  |  | 150 | 135 |
| 2-EHMA |  |  | 50 |  |

Footnotes for Table 1(4-1)
2-EHMA . . . 2-ethylhexylmethacrylate

TABLE 1(4-2)

|  | Reference Ex. 13 | Reference Ex. 14 | Reference Ex. 15 | Reference Ex. 16 |
|---|---|---|---|---|
| Xylene | 1500 | 1500 | 1200 | 1300 |
| AIBN |  |  | 5 | 10 |
| P—O | 110 | 110 | 60 | 80 |
| Xylene | 400 | 400 | 300 | 300 |
| Compound name | c-1-1 | c-2-1 | d-1 | a-2-2 |
| Mn | 950 | 900 | 970 | 700 |
| Mw | 1800 | 1700 | 1750 |  |

TABLE 1(5-1)

|  | Reference Ex. 17 | Reference Ex. 18 | Reference Ex. 19 | Reference Ex. 20 |
|---|---|---|---|---|
| Name of incorporated functional group | Acid anhydride group | Acid anhydride group | Silyl group | B—OH Acid anhydride group |
| TMSBA |  |  |  | 100 |
| maleic anhydride | 150 | 150 |  | 65 |
| itaconic anhydride | 150 |  |  |  |
| A-174 |  | 150 | 200 |  |
| Styrene | 130 | 130 | 50 | 100 |
| n-BMA |  |  | 170 | 50 |
| n-BA | 170 |  |  |  |
| 2-EHA |  |  | 150 | 135 |
| 2-EHMA |  |  | 50 |  |

TABLE 1(5-2)

|  | Reference Ex. 17 | Reference Ex. 18 | Reference Ex. 19 | Reference Ex. 20 |
|---|---|---|---|---|
| Xylene | 1500 | 1500 | 1200 | 1300 |
| AIBN |  |  | 5 | 10 |
| P—O | 110 | 110 | 60 | 80 |
| Xylene | 400 | 400 | 300 | 300 |
| Compound name | c-1-1 | c-2-1 | d-1 | a-2-2 |
| Mn | 950 | 900 | 970 | 700 |
| Mw | 1800 | 1700 | 1750 | 1350 |

TABLE 1(6-1)

|  | Reference Ex. 21 | Reference Ex. 22 | Reference Ex. 23 |
|---|---|---|---|
| Name of incorporated functional group | B—OH EP group Silyl group | B—OH Acid anhydride group Silyl group | EP group Silyl group |
| 1-EEEMA | 150 |  |  |
| TMSBA |  | 101 |  |
| GMA | 100 |  | 140 |
| maleic anhydride |  | 100 |  |
| A-174 |  | 50 | 200 |

TABLE 1(6-1)-continued

|  | Reference Ex. 21 | Reference Ex. 22 | Reference Ex. 23 |
|---|---|---|---|
| Styrene | 150 | 150 | 100 |
| n-BMA |  | 199 |  |
| n-BA |  |  | 60 |

TABLE 1(6-2)

|  | Reference Ex. 21 | Reference Ex. 22 | Reference Ex. 23 |
|---|---|---|---|
| Xylene | 1250 | 1500 | 1100 |
| AIBN | 30 | 20 |  |
| P—O | 90 | 55 | 75 |
| Xylene | 300 | 400 | 400 |
| Compound name | a-5-2 | a-7-2 | b-3-2 |
| Mn | 750 | 724 | 740 |
| Mw | 1480 | 1380 | 1370 |

TABLE 1(7-1)

|  | Reference Ex. 24 | Reference Ex. 25 | Reference Ex. 26 |
|---|---|---|---|
| Name of incorporated functional group | Acid anhydride group Silyl group | B—OH Acid anhydride group | B—OH EP group |
| 1-EEEMA |  |  | 150 |
| TMSBA |  | 100 |  |
| GMA |  |  | 100 |
| maleic anhydride | 150 | 65 |  |
| A-174 | 150 |  |  |
| Styrene | 130 | 100 | 150 |
| n-BMA | 170 |  |  |
| n-BA |  | 135 |  |

TABLE 1(7-2)

|  | Reference Ex. 24 | Reference Ex. 25 | Reference Ex. 26 |
|---|---|---|---|
| Xylene | 1500 | 1300 | 1250 |
| AIBN |  | 10 | 30 |
| P—O | 150 | 50 | 35 |
| Xylene | 400 | 300 | 300 |
| Compound name | c-2-2 | a-2-3 | a-5-3 |
| Mn | 680 | 1450 | 1475 |
| Mw | 1240 | 2805 | 2900 |

TABLE 1(8-1)

|  | Reference Ex. 27 | Reference Ex. 28 | Reference Ex. 29 |
|---|---|---|---|
| Name of incorporated functional group | B—OH Acid anhydride group Silyl group | EP group Silyl group | Acid anhydride group Silyl group |
| TMSBMA | 101 |  |  |
| GMA |  | 140 |  |
| maleic anhydride | 100 |  | 150 |
| A-174 | 50 | 200 | 150 |
| Styrene | 150 | 100 | 130 |
| n-BMA |  |  | 170 |
| n-BA | 199 | 60 |  |

TABLE 1(8-2)

|  | Reference Ex. 27 | Reference Ex. 28 | Reference Ex. 29 |
|---|---|---|---|
| Xylene | 1500 | 1100 | 1500 |
| AIBN |  |  |  |
| P—O | 40 | 35 | 40 |
| Xylene | 400 | 400 | 400 |
| Compound name | a-7-3 | b-3-3 | c-2-3 |
| Mn | 1465 | 1480 | 1454 |
| Mw | 2860 | 2930 | 2900 |

Examples 1~15 and Comparative Examples 1~2

In the following manner, the curable resin composition possessing a high solid content and paint of a high solid content according to the present invention, as well as resin compositions and paints (clear paints) for comparison were prepared. The resultant paints were then coated onto a predetermined coating plate and then baked (coat finishing process).

(Preparation of clear paint)

Initially, the resin compositions shown in Table 2 (1)~(6) were prepared. Subsequently, various types of clear paints were produced by diluting the resin compositions obtained in the above manner using methylamyl ketone at the coating temperature such that the viscosity according to a Ford cup No. 4 was 40 seconds.

(Coat-Finishing)

As the coating, in the case when the base paint is a solvent-type base paint (I) as mentioned above, a coating film of 17 microns ($\mu$m) is coated after diluting using a mixed solvent formed from toluene/n-butyl acetate/xylene (mixed proportion ratio=40/30/30) such that the viscosity according to a Ford cup No. 4 was 15 seconds, and then drying. Five minutes after coating, the clear paints obtained in each respective example which were formed by diluting each respective high solid content paint at the coating temperature such that the viscosity according to a Ford cup No. 4 was 40 seconds, were coated to a thickness of 40 $\mu$m.

In addition, in the case when the base paint is an aqueous base paint (II) as mentioned above, a coating film of 17 microns ($\mu$m) is coated after diluting using a mixed solvent formed from water/IPA (mixed proportion ratio=80/20) such that the viscosity according to a Ford cup No. 4 was 15 seconds, and then drying. Subsequently, after removing the water content by heating for five minutes at 80° C., the clear paints obtained in each respective example which were formed by diluting each respective high solid content paint at the coating temperature such that the viscosity according to a Ford cup No. 4 was 40 seconds, were coated to a thickness of 40 $\mu$m.

The paints coated in the aforementioned manner were allowed to set for 10 minutes, and then baked for 30 minutes at 140° C. Furthermore, as the coating plate, a zinc phosphate processed steel plate onto which a commercially available electrode-position paint and intermediate coat were coated to a thickness of 35 $\mu$m and baked, was employed.

TABLE 2(1)

|  | Example 1 | Example 2 | Example 3 | Example 4 |
|---|---|---|---|---|
| Compound (a-1-1) | 1000 | 1000 | 1000 | 1000 |
| Compound (b-1-1) | 800 |  |  |  |
| Compound (b-2-1) |  |  | 1250 |  |
| Compound (b-3-1) |  | 1000 |  |  |

TABLE 2(1)-continued

|  | Example 1 | Example 2 | Example 3 | Example 4 |
|---|---|---|---|---|
| Compound (b-4-1) |  |  |  | 1250 |
| A-187 |  |  |  | 10 |
| Compound (c-1-1) | 400 | 500 |  |  |
| Compound (d-1) | 500 |  | 500 |  |
| TBPBr |  | 25 |  |  |
| 1-methylimidazole |  |  | 20 |  |
| monoisopropyl phosphate |  |  |  | 15 |
| Clear Coat | CR-1 | CR-2 | CR-3 | CR-4 |

Footnotes for Table 2
A-187 . . . Product Name; Compound (molecular weight 236) jointly possessing an epoxy group and hydrolytic silyl group produced by Nihon Yuniker, K.K.
TBPBr . . . tetrabutylphosphonium bromide
To the aforementioned compositions, and further to the solid portions of the resin compositions, 1.5% parts by weight of the following UV light absorbent, and 1.0% parts by weight of the following light stabilizing agent were added.
"Chinubin Ti-900" . . . UV light absorbent manufactured by Ciba-Geigy (Switzerland)
"Sanol LS-123" . . . Light stabilizing agent manufactured by Ciba-Geigy (Switzerland)

TABLE 2(2)

|  | Example 5 | Example 6 |
|---|---|---|
| Compound (a-5-1) | 1000 |  |
| Compound (a-7-1) |  | 1000 |
| Compound (b-1-1) |  | 1000 |
| Compound (b-2-1) | 720 |  |
| 4-MHHPA |  | 20 |
| ethylsilicate |  | 50 |
| TBABr | 25 |  |
| TBPBr |  | 20 |
| Tin catalyst*1) | 3 |  |
| Clear Coat | CR-5 | CR-6 |

Footnotes for Table 2
4-MHHPA . . . 4-methylhexahydrophthalic anhydride
TBABr . . . tetrabutylammonium bromide
*1) di-n-butyl tin dilaurate was used as the tin catalyst

TABLE 2(3)

|  | Example 7 | Example 8 | Example 9 |
|---|---|---|---|
| Compound (a-2-1) |  | 1000 |  |
| Compound (a-5-1) |  |  | 1000 |
| Compound (a-6-1) | 1000 |  |  |
| Compound (b-3-1) |  | 750 |  |
| Compound (c-1-1) | 100 |  | 250 |
| Compound (d-1) | 50 |  |  |
| TBABr |  | 20 | 20 |
| TBPBr | 10 |  |  |
| Tin catalyst*1) |  | 2 | 2 |
| Clear Coat | CR-7 | CR-8 | CR-9 |

TABLE 2(4)

|  | Example 10 | Example 11 | Example 12 | Example 13 |
|---|---|---|---|---|
| Compound (a-2-2) |  |  | 1000 |  |
| Compound (a-2-3) |  |  |  | 1000 |
| Compound (a-3-1) | 1000 |  |  |  |
| Compound (a-7-1) |  | 1000 |  |  |
| Compound (b-1-1) |  | 565 |  |  |
| Compound (b-3-2) |  |  | 800 |  |
| Compound (b-3-3) |  |  |  | 800 |

TABLE 2(4)-continued

|  | Example 10 | Example 11 | Example 12 | Example 13 |
|---|---|---|---|---|
| Compound (c-2-1) | 540 |  |  |  |
| TBABr | 22 | 31 |  |  |
| TBPBr |  |  | 35 | 35 |
| Tin catalyst*1) |  |  |  |  |
| Clear Coat | CR-10 | CR-11 | CR-12 | CR-13 |

TABLE 2(5)

|  | Example 14 | Example 15 |
|---|---|---|
| Compound (a-5-2) | 1000 |  |
| Compound (a-5-3) |  | 1000 |
| Compound (c-2-2) | 545 |  |
| Compound (c-2-3) |  | 545 |
| TBPBr | 23 | 23 |
| Tin catalyst*1) | 2 | 2 |
| Clear Coat | CR-14 | CR-15 |

TABLE 2(6)

|  | Comparative Example 1 | Comparative Example 2 |
|---|---|---|
| Compound (a-1-1) | 1000 |  |
| Compound (a-2-1) |  | 1000 |
| Compound (c-1-1) | 400 |  |
| Compound (d-1) | 500 | 200 |
| ethylsilicate |  | 50 |
| TBPBr | 10 |  |
| Tin catalyst*1) |  | 20 |
| Clear Coat | CR-21 | CR-22 |

(Applied Examples 1~15 and Comparative Examples 1~2)
Various aspects of practical application were examined (i.e., evaluation tests of various performances) by means of using the clear coats and base coats separately obtained from each applied example 1~15 and comparative example 1~2 in the compositional proportions shown in Tables (1)~(6). These results are summarized in the same tables.

TABLE 3(1)

|  | Applied Example 1 | Applied Example 2 | Applied Example 3 | Applied Example 4 |
|---|---|---|---|---|
| Base coat to be used | I | II | II | II |
| Clear coat to be used | CR-1 | CR-2 | CR-3 | CR-4 |
| Coating Temperature (° C.) | 60 | 60 | 25 | 30 |
| Coating Non-volatile Content (%) | 92.0 | 91.0 | 82.5 | 83.0 |
| Luster | 101 | 98 | 97 | 95 |
| Lead Hardness | F | H | H | 2 H |
| Shock Resistance | 40 | 35 | 30 | 35 |
| Xylene • Rubbing | Good | Good | Good | Good |
| Acid Resistance | No traces | No traces | No traces | No traces |
| Alkali Resistance | No traces | No traces | No traces | No traces |
| Abrasion Resistance | 96 | 97 | 98 | 96 |
| Weather Resistance | 93 | 95 | 93 | 90 |

Footnotes for Table 3
The Evaluation tests for various performances were conducted according to the following approximate ranges.
Luster . . . Expressed using 60 degree mirror reflectivity
Hardness . . . Expressed by means of lead hardness at the time when the coating film first shows signs of damage using "Mitsubishi yumi" (product manufactured by Mitsubishi Enpitsu, K.K.)
Shock Resistance value . . . A DuPont shock test was performed using a ½-inch notch and a weight of 500 g.

TABLE 3(1)-continued

|  | Applied Example 1 | Applied Example 2 | Applied Example 3 | Applied Example 4 |
|---|---|---|---|---|

Acid Resistance ... The change in the state of the coating film was determined by observation after applying dropwise 0.2 ml of a 5% $H_2SO_4$ aqueous solution and then drying for 30 minutes at 80° C.
Alkali Resistance ... The change in the state of the coating film was determined by observation after applying dropwise 0.2 ml of a 5% NaOH aqueous solution and then drying for 30 minutes at 80° C.
Abrasion Resistance ... Expressed by luster retention (%) after soaking a felt piece in 5% by weight of a cleanser and then running a 1 Kg weight over this felt piece 30 times (round-trips).
Solvent Resistance ... The change in the state of the coating film was determined by observation after soaking a felt piece in xylene and rubbing 10 times (xylene rubbing test).
Weather Resistance ... Expressed by luster retention (%) of the coating film after processing for 3,000 hours using an accelerated weathering machine.

TABLE 3(2)

|  | Applied Example 5 | Applied Example 6 |
|---|---|---|
| Base coat to be used | I | II |
| Clear coat to be used | CR-5 | CR-7 |
| Coating Temperature (° C.) | 60 | 70 |
| Coating Non-volatile Content (%) | 90.2 | 94.0 |
| Luster | 100 | 101 |
| Lead Hardness | F | H |
| Shock Resistance | 40 | 35 |
| Xylene • Rubbing | Good | Good |
| Acid Resistance | No traces | No traces |
| Alkali Resistance | No traces | No traces |
| Abrasion Resistance | 97 | 93 |
| Weather Resistance | 95 | 94 |

TABLE 3(3)

|  | Applied Ex. 7 | Applied Ex. 8 | Applied Ex. 9 |
|---|---|---|---|
| Base coat to be used | II | II | II |
| Clear coat to be used | CR-7 | CR-8 | CR-9 |
| Coating Temperature (° C.) | 25 | 60 | 25 |
| Coating Non-volatile Content (%) | 81.2 | 92.0 | 83.2 |
| Luster | 98 | 96 | 97 |
| Lead Hardness | H | H | H |
| Shock Resistance | 35 | 35 | 30 |
| Xylene • Rubbing | Good | Good | Good |
| Acid Resistance | No traces | No traces | No traces |
| Alkali Resistance | No traces | No traces | No traces |
| Abrasion Resistance | 97 | 95 | 98 |
| Weather Resistance | 93 | 92 | 90 |

TABLE 3(4)

|  | Applied Ex. 10 | Applied Ex. 11 | Applied Ex. 12 | Applied Ex. 13 |
|---|---|---|---|---|
| Base coat to be used | II | II | I | I |
| Clear coat to be used | CR-10 | CR-11 | CR-12 | CR-13 |
| Coating Temperature (° C.) | 60 | 60 | 25 | 25 |
| Coating Non-volatile Content (%) | 91.0 | 89.5 | 85.0 | 79.0 |
| Luster | 96 | 96 | 98 | 93 |
| Lead Hardness | H | H | F | H |
| Shock Resistance | 30 | 40 | 30 | 40 |
| Xylene • Rubbing | Good | Good | Good | Good |
| Acid Resistance | No traces | No traces | No traces | No traces |
| Alkali Resistance | No traces | No traces | No traces | No traces |
| Abrasion Resistance | 96 | 95 | 85 | 87 |
| Weather Resistance | 86 | 90 | 80 | 81 |

TABLE 3(5)

|  | Applied Ex. 14 | Applied Ex. 15 |
|---|---|---|
| Base coat to be used | II | II |
| Clear coat to be used | CR-14 | CR-15 |
| Coating Temperature (° C.) | 60 | 60 |
| Coating Non-volatile Content (%) | 91.0 | 89.5 |
| Luster | 96 | 96 |
| Lead Hardness | H | H |
| Shock Resistance | 30 | 40 |
| Xylene • Rubbing | Good | Good |
| Acid Resistance | No traces | No traces |
| Alkali Resistance | No traces | No traces |
| Abrasion Resistance | 84 | 96 |
| Weather Resistance | 80 | 93 |

TABLE 3(6)

|  | Comparative Example 1 | Comparative Example 2 |
|---|---|---|
| Base coat to be used | I | II |
| Clear coat to be used | CR-21 | CR-22 |
| Coating Temperature (° C.) | 20 | 20 |
| Coating Non-volatile Content (%) | 70 | 70 |
| Luster | 98 | 98 |
| Lead Hardness | HB | HB |
| Shock Resistance | 20 | 15 |
| Xylene • Rubbing | Poor | Poor |
| Acid Resistance | traces | traces |
| Alkali Resistance | observed | observed |
|  | traces observed | traces observed |
| Abrasion Resistance | 58 | 43 |
| Weather Resistance | 65 | 60 |

Possibilities for Industrial Use

As described above, the curable resin composition or paint according to the present invention can be applied to various so-called metal materials and metal products such as vehicles, construction materials, and the like. In addition, the coating layer obtained by means of the coat finishing method of the present invention is useful as a top coat for vehicles, and displays superior resistance to acid, solvent, weather, abrasion and the like.

We claim:

1. A curable resin composition comprising at least one vinyl polymer and containing all of the following four functional groups:
   (i) a blocked hydroxyl group which is easily cleaved by atmospheric moisture and heat application to form a free hydroxyl group;
   (ii) an epoxy group;
   (iii) an acid anhydride group; and
   (iv) a hydrolytic silyl group,
      wherein the blocked hydroxyl group (i) and the epoxy group (ii) are in a single vinyl polymer having a number average molecular weight of not greater than 1,500, or the blocked hydroxyl group (i) and the epoxy group (ii) arc respectively in two different vinyl polymers each having a number average molecular weight of not greater than 1,500, wherein the acid anhydride group (iii) is in a vinyl polymer having a number average molecular weight of not greater than 1,500 which may be the same as or different from the vinyl polymer containing at least one of the blocked hydroxyl group (i) and epoxy group (ii), or the acid anhydride group (iii) is in an acid anhydride group-containing compound, wherein the hydrolytic silyl group (iv) is in a vinyl polymer having a number average molecular weight of not greater than 5,000 which may be the same as or different from the vinyl polymer containing at least one of the blocked hydroxyl group (i), epoxy group (ii) and acid anhydride group (iii), or the hydrolytic silyl group (iv) is in a hydrolytic silyl group-containing compound which may also contain an epoxy group in addition to the epoxy group (ii) in said vinyl polymer having a number average molecular weight not greater than 1,500;

and wherein said blocked hydroxyl group has a structure represented by one of the formulas (I), (II) or (III)

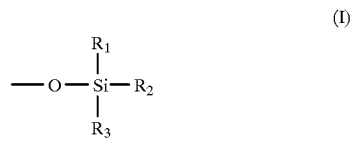

(I)

wherein $R_1$ and $R_2$ may be the same or different and is independently a $C_{1-18}$ alkyl group, phenyl group, or aryl group, or a hydrogen atom, chlorine atom, or fluorine atom; $R_3$ is a $C_{1-18}$ alkyl group, phenyl group, or aryl group;

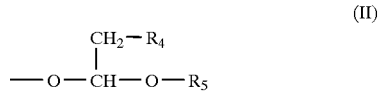

(II)

wherein $R_4$ is a hydrogen atom or a $C_{1-10}$ alkyl group; and $R_5$ is a $C_{1-22}$ alky group with at least one substituent selected from the group consisting of cycloalkyl group, aryl group, alkoxy group, alkanoyoxy group, $C_{1-18}$ alkyl group, and a halogen atom; and

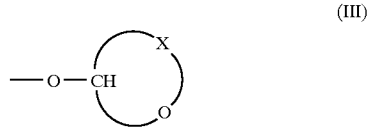

(III)

wherein X is a $C_{1-18}$ alkyl group with at least one substituent selected from the group consisting of akoxyl group, arakyl group, aryl group, aryloxy group, alkanoyloxy group, $C_{1-10}$ alkyl group, and a halogen atom.

2. A curable resin composition according to claim 1, wherein said vinyl polymer having an average molecular weight of not greater than 1,500 and containing said blocked hydroxyl group (i) is selected from the group consisting of:

(a-1) a vinyl polymer containing said blocked hydroxyl group;

(a-2) a vinyl polymer containing an acid anhydride group in addition to said blocked hydroxyl group;

(a-3) a vinyl polymer containing an epoxy group in addition to said blocked hydroxyl group;

(a-4) a vinyl polymer containing a hydrolytic silyl group in addition to said blocked hydroxyl group;

(a-5) a vinyl polymer containing an epoxy group and a hydrolytic silyl group in addition to said blocked hydroxyl group;

(a-6) a vinyl polymer containing an epoxy group and an acid anhydride group in addition to said blocked hydroxyl group;

(a-7) a vinyl polymer containing a hydrolytic silyl group and an acid anhydride group in addition to said blocked hydroxyl group; and (a-8) a vinyl polymer containing an epoxy group, an acid anhydride group, and a hydrolytic silyl group in addition to said blocked hydroxyl group.

3. A curable composition according to any one of claims 1 or 2, wherein said vinyl polymer having an average molecular weight of not greater than 1,500 and containing said epoxy group (ii) is selected from the group consisting of:

(b-1) a vinyl polymer containing said epoxy group;

(b-2) a vinyl polymer containing an acid anhydride group in addition to said epoxy group;

(b-3) a vinyl polymer containing a hydrolytic silyl group in addition to said epoxy group; and (b-4) a vinyl polymer containing an acid anhydride group and a hydrolytic silyl group in addition to said epoxy group.

4. A curable composition according to any one of claims 1 or 3, wherein said vinyl polymer having an average molecular weight of not greater than 1,500 and containing said acid anhydride group (iii) is selected from the group consisting of:

(c-1) a vinyl polymer containing said acid anhydride group; and (c-2) a vinyl polymer containing a hydrolytic silyl group in addition to said acid anhydride group.

5. A curable composition according to claim 1, wherein said blocked hydroxyl group represented by formula (I) is a trimethylsiloxy group.

6. A curable composition according to claim 1, wherein said blocked hydroxyl group represented by formula (II) is a 1-alkoxyethoxyalkyl group.

7. A paint comprising as a binder a curable resin composition comprising at least one vinyl polymer and containing all of the following four functional groups:

(i) a blocked hydroxyl group which is easily cleaved by atmospheric moisture and heat application to form a free hydroxyl group;

(ii) an epoxy group;

(iii) an acid anhydride group; and (iv) a hydrolytic silyl group, wherein the blocked hydroxyl group (i) and the epoxy group (ii) are in a single vinyl polymer having a number average molecular weight of not greater than 1,500, or the blocked hydroxyl group (i) and the epoxy group (ii) are respectively in two different vinyl polymers each having a number average molecular weight of not greater than 1,500, wherein the acid anhydride group (iii) is in a vinyl polymer having a number average molecular weight of not greater tan 1,500 which may be the same as or different from the vinyl polymer containing at least one of the blocked hydroxyl group (i) and epoxy group (ii), or the acid anhydride group (iii) is in an acid anhydride group-cotaining compound, wherein the hydrolytic silyl group (iv) is in a vinyl polymer having a number average molecular weight of not greater than 5,000 which may be the same as or different from the vinyl polymer containing at least one of the blocked hydroxyl group (i), epoxy group (ii) and acid anhydride group (iii), or the hydrolytic silyl group (iv) is in a hydrolytic silyl group-containing compound which may also contain an epoxy group in addition to tile epoxy group (ii) in said vinyl polymer having a number average molecular weight not greater than 1,500;

and wherein said blocked hydroxyl group has a structure represented by one of the formulas (I), (II) or (III)

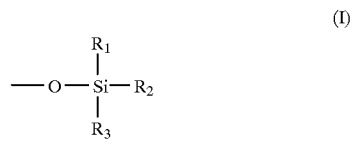
(I)

wherein $R_1$ and $R_2$ may be the same or different and is independently a $C_{1-18}$ alkyl group, phenyl group, or aryl group, or a hydrogen atom, chlorine atom, or fluorine atoms; $R_3$ is a $C_{1-18}$ alkyl group, phenyl group, or aryl group;

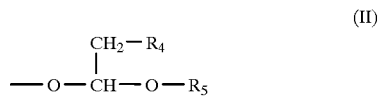
(II)

wherein $R_4$ is a hydrogen atom or a $C_{1-10}$ alkyl group; and $R_5$ is a $C_{1-22}$ alkyl group with at least one substituent selected from the group consisting of cycloalkyl group, aralkyl group, aryl group, alkoxy group, alkanoyloxy group, $C_{1-18}$ alkyl group, and a halogen atom; and

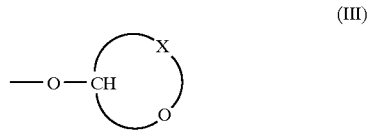
(III)

wherein X is a $C_{1-18}$ alkyl group with at least one substituent selected from the group consisting of alkoxy group, aryalkyl group, aryl group, arloxy group, alkanoyloxy group, $C_{1-10}$ alkyl group, and a halogen atom.

8. A paint according to claim 7, wherein said vinyl polymer having an average molecular weight of not greater than 1,500 and containing said blocked hydroxyl group (i) is selected from the group consisting of:

(a-1) a vinyl polymer containing said blocked hydroxyl group;

(a-2) a vinyl polymer containing an acid anhydride group in addition to said blocked hydroxyl group;

(a-3) a vinyl polymer containing an epoxy group in addition to said blocked hydroxyl group;

(a-4) a vinyl polymer containing a hydrolytic silyl group in addition to said blocked hydroxyl group;

(a-5) a vinyl polymer containing an epoxy group and a hydrolytic silyl group in addition to said blocked hydroxyl group;

(a-6) a vinyl polymer containing an epoxy group and an acid anhydride group in addition to said blocked hydroxyl group;

(a-7) a vinyl polymer containing a hydrolytic silyl group and an acid anhydride group in addition to said blocked hydroxyl group; and (a-8) a vinyl polymer containing an epoxy group, an acid anhydride group, and a hydrolytic silyl group in addition to said blocked hydroxyl group.

9. A paint according to any one of claim 7 or 8, wherein said vinyl polymer having an average molecular weight of not greater than 1,500 and containing said epoxy group (ii) is selected from the group consisting of:

(b-1) a vinyl polymer containing said epoxy group;

(b-2) a vinyl polymer containing an acid anhydride group in addition to said epoxy group;

(b-3) a vinyl polymer containing a hydrolytic silyl group in addition to said epoxy group; and (b-4) a vinyl polymer containing an acid anhydride group and a hydrolytic silyl group in addition to said epoxy group.

10. A paint according to any one of claims 7 or 9, wherein said vinyl polymer having an average molecular weight of not greater than 1,500 and containing said acid anhydride group (iii) is selected from the group consisting of:

(c-1) a vinyl polymer containing said acid anhydride group; and (c-2) a vinyl polymer containing a hydrolytic silyl group in addition to said acid anhydride group.

* * * * *